Nov. 9, 1965 E. B. DAHLIN 3,217,152
SELECTIVELY VARIABLE SEQUENTIAL SIGNAL GENERATOR
Filed Feb. 23, 1961 2 Sheets-Sheet 1

INVENTOR.
ERIK B. DAHLIN
BY Arthur H. Swanson
ATTORNEY.

INVENTOR.
ERIK B. DAHLIN
BY Arthur H. Swanson
ATTORNEY.

United States Patent Office 3,217,152

Patented Nov. 9, 1965

3,217,152
SELECTIVELY VARIABLE SEQUENTIAL SIGNAL GENERATOR

Erik B. Dahlin, Pottstown, Pa., assignor to Honeywell Inc., a corporation of Delaware Filed Feb. 23, 1961, Ser. No. 91,045
3 Claims. (Cl. 235—197)

This invention relates to signal generators. More specifically, the present invention relates to selectively variable signal generators.

An object of the present invention is to provide an improved selectively variable signal generator.

Another object of the present invention is to provide an improved signal generator for sequentially producing a plurality of selectively variable signals.

A further object of the present invention is to provide an improved signal generator, as described herein, having a simplified operation and construction.

In accomplishing these and other objects, there has been provided, in accordance with the present invention, a signal generator having a sequential signal source for sequentially selecting a plurality of function networks to produce a series of preset function signals. Additionally, the sequential signal source is used to select an output line for distributing the selected function signals and to select an input signal to energize the selected function network. Thus, the selection of the function network in combination with the energization thereof by a selected input signal is effective to produce a predetermined representative function signal for subsequent distribution to a selected output line.

A better understanding of the present invention may be had from the following detailed description when read in connection with the accompanying drawing, in which.

Figure 1:
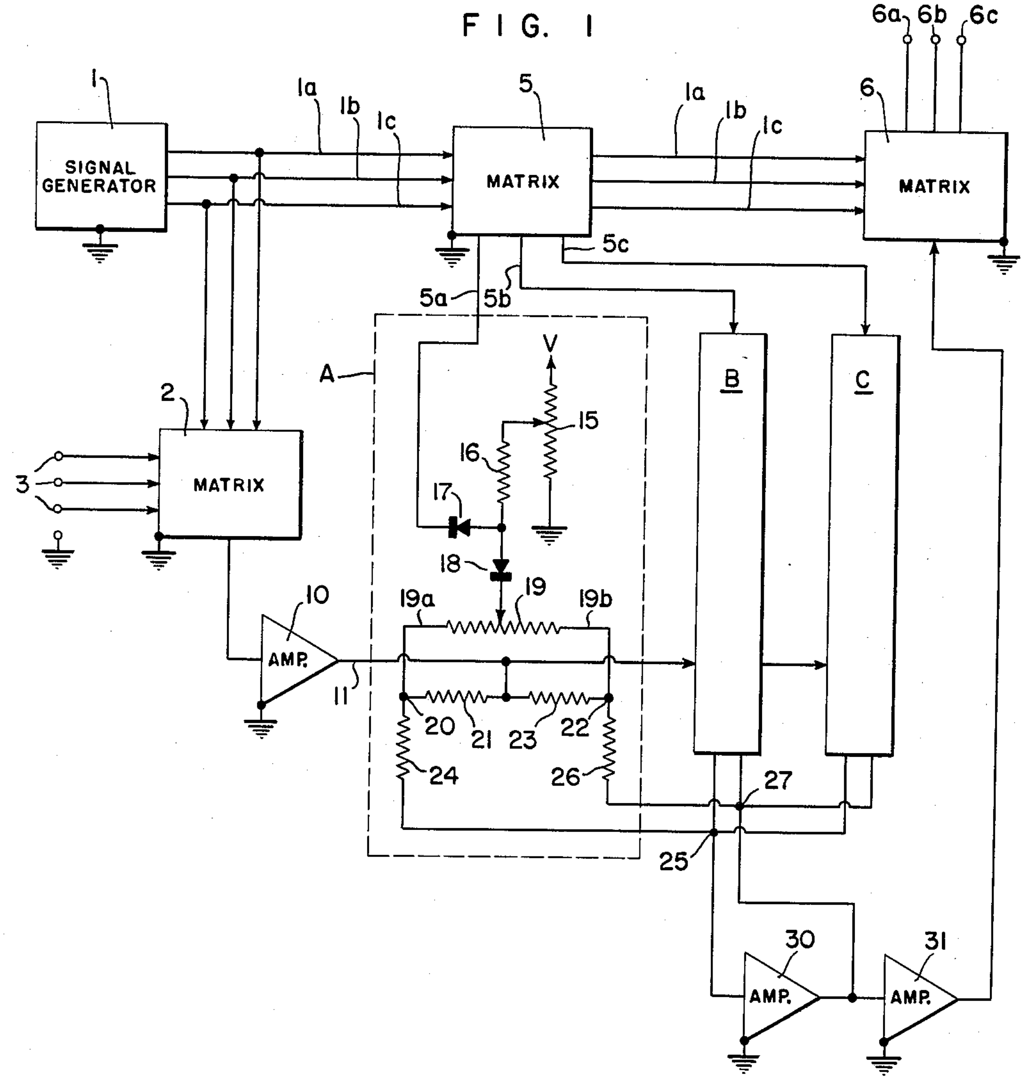
FIG. 1 is a schematic representation of selectively variable signal generator embodying the present invention.
Figure 2:
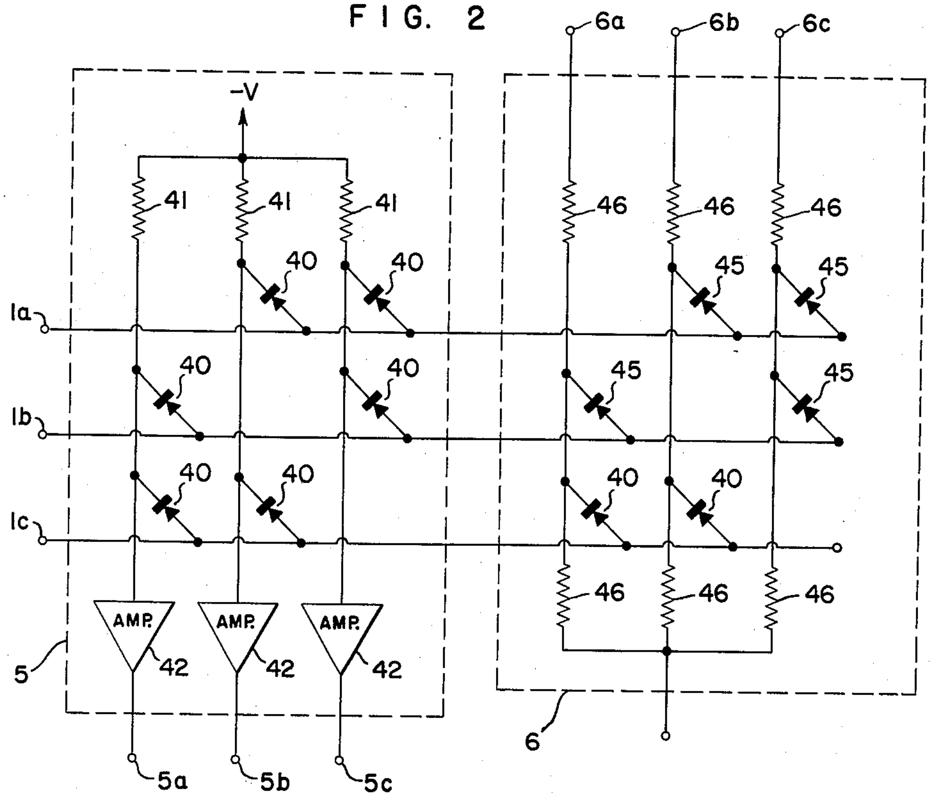
FIG. 2 is a schematic representation of selection matrices for use with the signal generator shown in FIG. 1.

Referring to FIG. 1 in more detail, there is shown a selectively variable signal generator including a signal source 1. The signal source 1 is effective to supply a plurality of similar signals, sequentially appearing on corresponding signal lines 1*a*, 1*b*, 1*c*. These sequential signals are applied as energizing control signals to an input signal selecting matrix 2. A plurality of input terminals 3 are provided for connecting the selecting matrix 2 to a plurality of input signals. The input signals may be any group of signals which it is desired to selectively compare with individual set-point, or reference, signals, to produce respective error signals for selective distribution. For example, the input signals may be derived from a plurality of transducers monitoring a system process. The comparison of these transducer signals would be effective to produce error signals suitable for indicating the operating level of the process. The aforesaid sequential signals are also applied to a function selecting matrix 5 having a plurality of output signal lines 5*a*, 5*b*, and 5*c* and an output signal selecting matrix 6 having a plurality of output function lines 6*a*, 6*b* and 6*c*. The aforesaid matrices 2, 5 and 6 may be any suitable circuit interconnecting devices wherein an input signal applied thereto may be routed under selective control of applied control signals to a desired one of a plurality of output signal lines. Suitable matrices for use with the present invention are shown in FIG. 2 and are described hereinafter.

An input signal selected by the input signal selecting matrix 2 is amplified by a first amplifier 10 and is, subsequently, applied on an input signal line 11 to a plurality of function networks A, B and C. The following description is specifically directed to the first function network A but is equally applicable to the other function networks B and C. Thus, the first function network A may comprise a source of bias signal V applied across a first potentiometer 15. A bias signal, taken from the slider of the potentiometer 15, is applied through a first resistor 16 to the anodes of a first and a second diode 17, 18. The cathode of the first diode 17 is connected to a first output signal line 5*a* from the function selecting matrix 5. The cathode of the second diode 18 is connected to the slider of a second potentiometer 19 having a first end 19*a* and a second end 19*b*. The first end 19*a* of the potentiometer 19 is connected to a first junction 20. The first junction 20 is connected through a second resistor 21 to the input signal line 11. Similarly, the second end 19*b* of the potentiometer 19 is connected to a second junction 22. The second junction 22 is also connected through a third resistor 23 to the input signal line 11.

The first junction 20 is connected through a first output resistor 24 to third junction 25. Similarly, the second junction 22 is connected through a second output resistor 26 to a fourth junction 27.

As previously mentioned, the remaining networks B and C are substantially identical to the first network A and are similarly connected to corresponding output signal lines from the function selecting matrix 5 and to the input signal line 11. Thus, the second output signal line 5*b* is connected in the second network B to a point similar to that described above for the line 5*a* in the first network A. Further, the second network is also connected to the third and fourth junctions 25 and 27 in a manner similar to that described above with relation to the first network A. Also, the third network C is similarly connected to the third output signal line 5*c*, the input signal line 11 and the third and fourth junctions 25 and 27.

The third junction 25 is connected to the input circuit of a second amplifier 30. An output signal from the second amplifier 30 and the fourth junction 27 are connected to the input circuit of a third amplifier 31. An output signal from the third amplifier 31 is connected to the output signal selecting matrix 6 whereby it is selectively applied to the output function lines 6*a*, 6*b*, and 6*c*.

The mode of operation of the present invention is as follows:

Assume that the signal source 1 is initially effective to supply a selection signal on the first source output line 1*a* and that this signal is effective to select the first output signal line 5*a*, the first output function line 6*a* and one of the input signals applied to the input signal terminals 3. Thus, the input signal is selected by the effect of the selection signal on the input signal selecting matrix 2. The selecting matrix 2 may be arranged to select a different input signal corresponding to the presence of the selection signal on one of the source output lines 1*a*, 1*b* and 1*c*. Similarly, the first output signal line 5*a* is selected by the effect of the selection signal on the function selecting matrix 5, and the first output function line 6*a* is selected by the effect of the selection signal on the output signal selecting matriv 6. As previously discussed, the function selecting matrix 5 and the output signal selecting matrix 6 are similar to the input signal selecting matrix 2.

The input signal selected by the selection signal is applied to the input circuit of the first amplifier 10. The corresponding amplified input signal appearing in the output circuit of the first amplifier 10 is applied to the function networks A, B and C. Specifically, this amplified signal is applied to the first and second junctions 20, 22 through the second and third resistors 21 and 23, respectively, in the first network A and to similar points in the second and third networks B and C. While the following discussion of the operation of the present device is directed to the first network A, it is to be noted that it is equally applicable to the second and third networks B and C. Further, for the purpose of discussion, the amplified input signal, the signal from the energizing source V, and the signal from the function selecting matrix 5 are assumed to have a negative polarity.

Thus, the function selecting matrix 5 is arranged to apply a negative polarity signal on each of the output signal lines 5*a*, 5*b* and 5*c* to represent a non-selected condition of these signal lines. This negative polarity signal is arranged to place the cathode of the first diode 17 at a greater negative potential than the anode of this diode. Accordingly, the first diode 17 is held in a conducting condition, and the aforesaid negative polarity signal is applied through the conducting first diode 17 to the anode of the second diode 18. This negative signal is arranged to have an amplitude greater than the amplitude of the amplified input signal. Since the amplified input signal is applied to the first and second junctions 20 and 22 and, thus, to the cathode of the second diode 18, the second diode 18 is held in a non-conducting condition by the larger negative signal applied to its anode. The amplified input signal is applied equally to the third junction 25 and the fourth junction 27. The second amplifier 30 is arranged to invert the polarity of the signals appearing at the third junction 25 and to apply the inverted signal to the fourth junction 27 where it is algebraically summed with any other signals applied thereto. The gain of the second amplifier 30 is adjusted to provide an inverted signal having an amplitude which is effective to produce an algebraic sum of zero. Thus, the input signal to the third amplifier 31 is effectively a zero amplitude signal representing the algebraic sum of the signals appearing at the fourth junction 27. Accordingly, the output signal as applied to the output function line 6*a* as selected by output signal selecting matrix 6 is a zero amplitude signal.

The first function network A is selected by a termination of the negative signal from the function selecting network 5. This is effective to terminate the conducting condition of the first diode 17 by placing its anode at a negative polarity with respects to its cathode by means of the negative polarity signal applied by the energizing source V. The negative polarity signal from the source V is also applied to the anode of the second diode 18. This negative polarity signal is arranged to have a lower amplitude than the amplitude of the negative polarity amplified input signal from the first amplifier 10 which input signal is applied to the cathode of the second diode 18. Thus, since the anode of this diode is placed at a positive polarity with respect to its cathode, the second diode 18 is placed into a conducting state. This conducting state is effective to apply the input signal to the slider of the first potentiometer 15. The impedances of the two signal paths from the first and second junctions 20 and 22 to the slider of the first potentiometer 15 are determined by the relative position of the slider of the second potentiometer 19. Additionally, the amplitude of the signal in these signal paths is affected by the amplitude of the opposing signal applied by the source V, which amplitude is determined by the position of the slider of the first potentiometer 15. Accordingly, the amplitudes of respective signals appearing at the first and second junctions 20 and 22 are preset by the first and second potentiometers 15 and 19. These signals are applied to the third and fourth junctions 25 and 27, as previously described, to form an effective difference signal in the output circuit of the third amplifier 31. This difference signal is applied to the output signal selecting matrix 6*a*. This matrix is effective to apply this signal to the first output function line 6*a*. Thus, the amplitude of the selected function signal appearing on the selected output function line 6*a* is selectively preset by the first and second potentiometers 15 and 19 in the first function network A. Similarly, the second and third function networks B and C may be selectively preset to produce respective function signals when these networks are selected in a manner as described above with respect to the first network A.

The further operation of the apparatus shown in FIG. 1 may involve a termination of the selection of the first network A by a change in the aforesaid selection operation and a selection of the remaining networks B and C, either singly or in combination with the first network A. Further, a new input signal and a different output function line may be selected in a manner as described above. Thus, the apparatus shown in FIG. 1 is effective to sequentially produce output functions having selectively preset amplitudes in a selective combination on the output function lines 6*a*, 6*b* and 6*c*.

A suitable device for the selection matrices 5 and 6 of FIG. 1 is shown in FIG. 2 with similar numbers being used for elements common to the two figures. The function selecting matrix 5 has a plurality of diodes 40 arranged in a coded pattern between the source output lines 1*a*, 1*b* and 1*c* and the output signal lines 5*a*, 5*b* and 5*c*. These output signal lines are energized by an energizing signal source —V through respective source resistors 41. The signal applied to diodes 40 from the source —V is effective in combination with the signals applied to the source output lines 1*a*, 1*b*, and 1*c* to place the diodes 40 in either a conducting or a non-conducting condition. Thus, assuming the energizing source —V is applying signals of a negative polarity to the cathodes of the diodes 40, the signals appearing on the signal source lines 1*a*, 1*b*, and 1*c* are applied to the anodes of the diodes 40 and are effective to maintain the anodes at a positive polarity with respect to the energizing source —V. Accordingly, the diodes 40 are held in a conducting state and no signal from the energizing source —V is applied to the output signal lines 5*a*, 5*b*, and 5*c*. A desired combination of these output signal lines is selected by reversing the effective polarity of the signal applied to the desired signal source lines 1*a*, 1*b*, and 1*c* with respect to the signals from the energizing source —V. This change in relative polarity is effective to make the anode of the affected ones of the diodes 40 negative with respect to the cathode. Thus, the polarity reversal is effective to temporarily terminate the conductive state of the selected ones of the diodes 40. Accordingly, an energizing signal from the energizing source —V is applied to a desired combination of the output signal lines 5*a*, 5*b* and 5*c*. For example, applying a negative polarity signal on the signal source lines 1*a* and 1*b* with respect to the source —V while maintaining line 1*c* positive with respect to the source —V is effective to terminate the conduction of the diodes 40 associated with lines 1*a* and 1*b*. As may be seen from FIG. 2, the continued conduction of the diodes 40 associated with the signal line 1*c* is effective to prevent a signal from the source —V from appearing on the output signal lines 5*a* and 5*b*. However, the termination of the conductive state of the diodes 40 associated with lines 1*a* and 1*b* is effective to allow a signal from the energizing source —V to appear on the line 5*c* since none of the diodes 40 associated with this line are in a conductive state. Similarly, other combinations of polarity reversals on the signal source lines 1*a*, 1*b* and 1*c* are effective to produce an output signal on corresponding combinations of the output signal lines 5*a*, 5*b* and 5*c*. A plurality of signal inverting amplifiers 42 are inserted in corresponding ones of the signal output lines 5*a*, 5*b* and 5*c* to produce a signal having a polarity suitable for use with the rest of the apparatus of the present invention shown in FIG. 1.

The output function signal selecting matrix 6 is similar to the function selecting matrix 5. Thus, the matrix 6 has a plurality of diodes 45 arranged in a coded pattern with a plurality of isolating resistors 46 in the output function lines 6*a*, 6*b* and 6*c*. This matrix operates in a manner similar to that discussed above with relation to the function selecting matrix 5. Thus, the signals appearing on the input line to this matrix are applied to the output function lines 6*a*, 6*b*, and 6*c* by selectively placing the diodes 45 in a non-conducting state as described above. A similar matrix may also be used for the input signal matrix 2 wherein the output function lines 6*a*, 6*b* and 6*c* would correspond to the input signal lines 3. The operation of the input signal matrix 2, accordingly, would be similar to that described above for the network selecting matrix 5 and the output function selecting matrix 6.

Thus, it may be seen that there has been provided, in accordance with the present invention, a signal generator which is characterized by the ability to sequentially produce a plurality of selectively preset signals.

What is claimed is:

1. A signal generator comprising a plurality of network means for producing a corresponding plurality of preset output signals in response to input signals and selection signals applied thereto, selection means for selectively applying selection signals to a combination of said network means, input signal means for selectively applying input signals to said network means, output signal means for selectively routing said output signals from said network means, and signal source means separately connected to said selection means, said input signal means and said output signal means for sequentially energizing said selection means, said input signal means, and said output signal means whereby to produce desired sequential signal generator output signals.

2. A signal generator comprising a plurality of network means for producing a corresponding plurality of preset signals in response to input signals and selection signals applied thereto, each of said means including a potentiometer having a first and a second end and a slider, means for applying an input signal to said first end and to said second end, circuit means connected to said slider for providing a signal path for said input signal, a first output signal circuit means connected to said first end, and a second output signal circuit means connected to said second end, a first amplifier means for inverting the polarity of the sum of the output signals in each of said first output signal circuit means of said plurality of networks, a second amplifier means for algebraically summing the output signal from said first amplifier with the sum of the output signals in each of said second output signal circuit means of said plurality of networks, selection means for selecting a combination of said network means by applying selection signals thereto, input signal means for selectively applying input signals to said network means, output signal means for selectively routing the output signal from said second amplifier means, and signal generating means for sequentially energizing said selection means, said input signal means and said output signal means whereby to produce desired sequential signal generator output signals.

3. A signal generator comprising a plurality of network means for producing a corresponding plurality of preset signals in response to input signals and selection signals applied thereto, each of said means including a potentiometer having a first and a second end and a slider, means for applying an input signal to said first end and to said second end, circuit means connected to said slider for providing a signal path for said input signal and for applying a bias signal to oppose said input signal, a first output signal circuit means connected to said first end, and a second output signal circuit means connected to said second end, a first amplifier means for inverting the polarity of the sum of the output signals in each of said first output signal circuit means of said plurality of networks, a second amplifier means for algebraically summing the output signal from said first amplifier with the sum of the output signals in each of said second output signal circuit means of said plurality of networks, selection means for selecting a combination of said network means by applying selection signals thereto, input signal means for selectively applying input signals to said network means, output signal means for selectively routing the output signal from said second amplifier means, and sequential signal means for sequentially energizing said selection means, said input signal means and said output signal means whereby to produce desired sequential signal generator output signals.

References Cited by the Examiner

UNITED STATES PATENTS

| | | | |
|---|---|---|---|
| 2,886,244 | 5/59 | Hunt | 235—197 |
| 2,933,254 | 4/60 | Goldberg et al. | 235—197 |
| 2,948,474 | 8/60 | Seay | 235—197 |
| 3,034,101 | 5/62 | Loewe | 235—151 |

OTHER REFERENCES

Pages 765–775, August 1954, French et al.: "A Curve Analyzer and General Purpose Graphical Computer" The Review of Scientific Instruments.

MALCOLN A. MORRISON, *Primary Examiner.*

WALTER W. BURNS, Jr., *Examiner.*